R. H. ROSENBERG.
GEARING.
APPLICATION FILED FEB. 14, 1912.
1,164,871.
Patented Dec. 21, 1915.
3 SHEETS—SHEET 2.
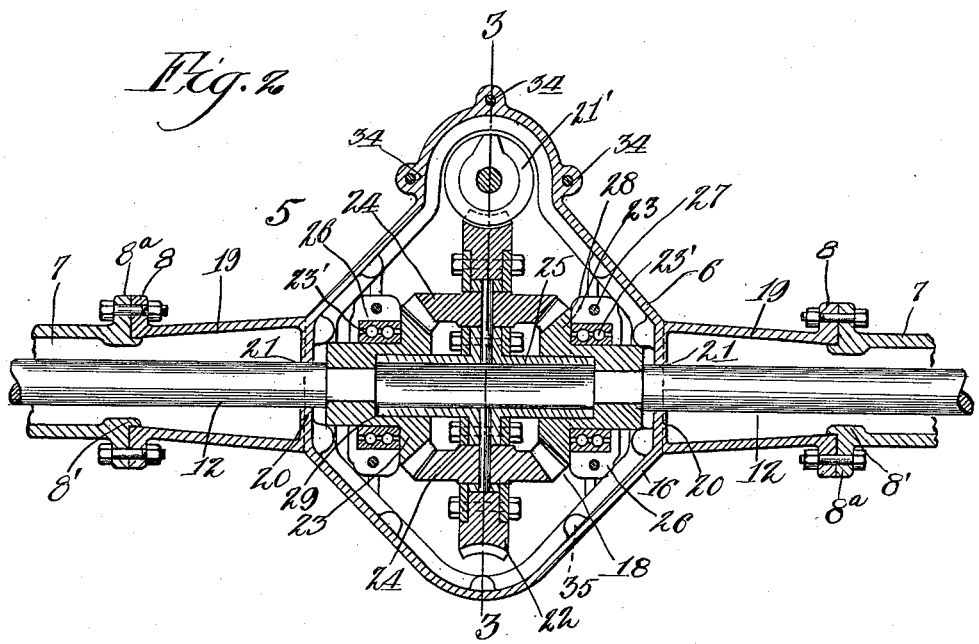
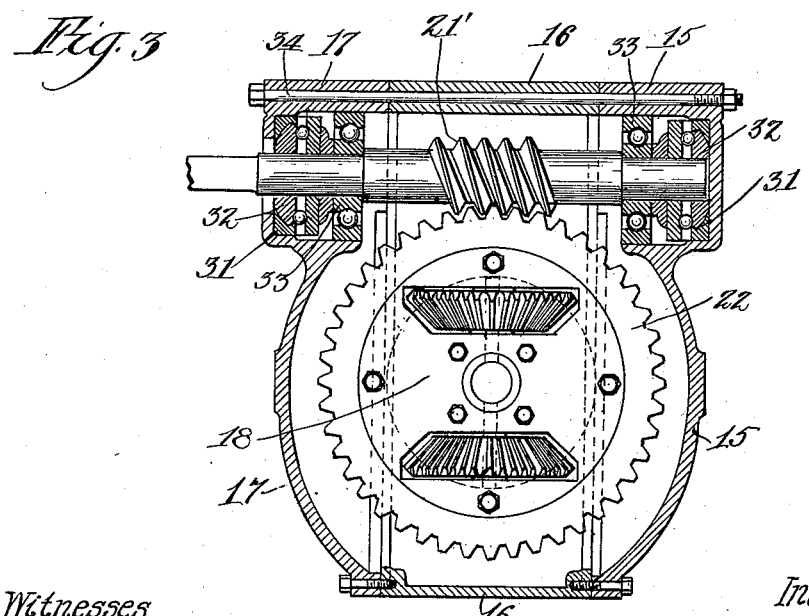
Witnesses
Robert S. McCreadie
Edward F. Wilson
Inventor
Ralph H. Rosenberg
by Hanley & Spellman
Attys.

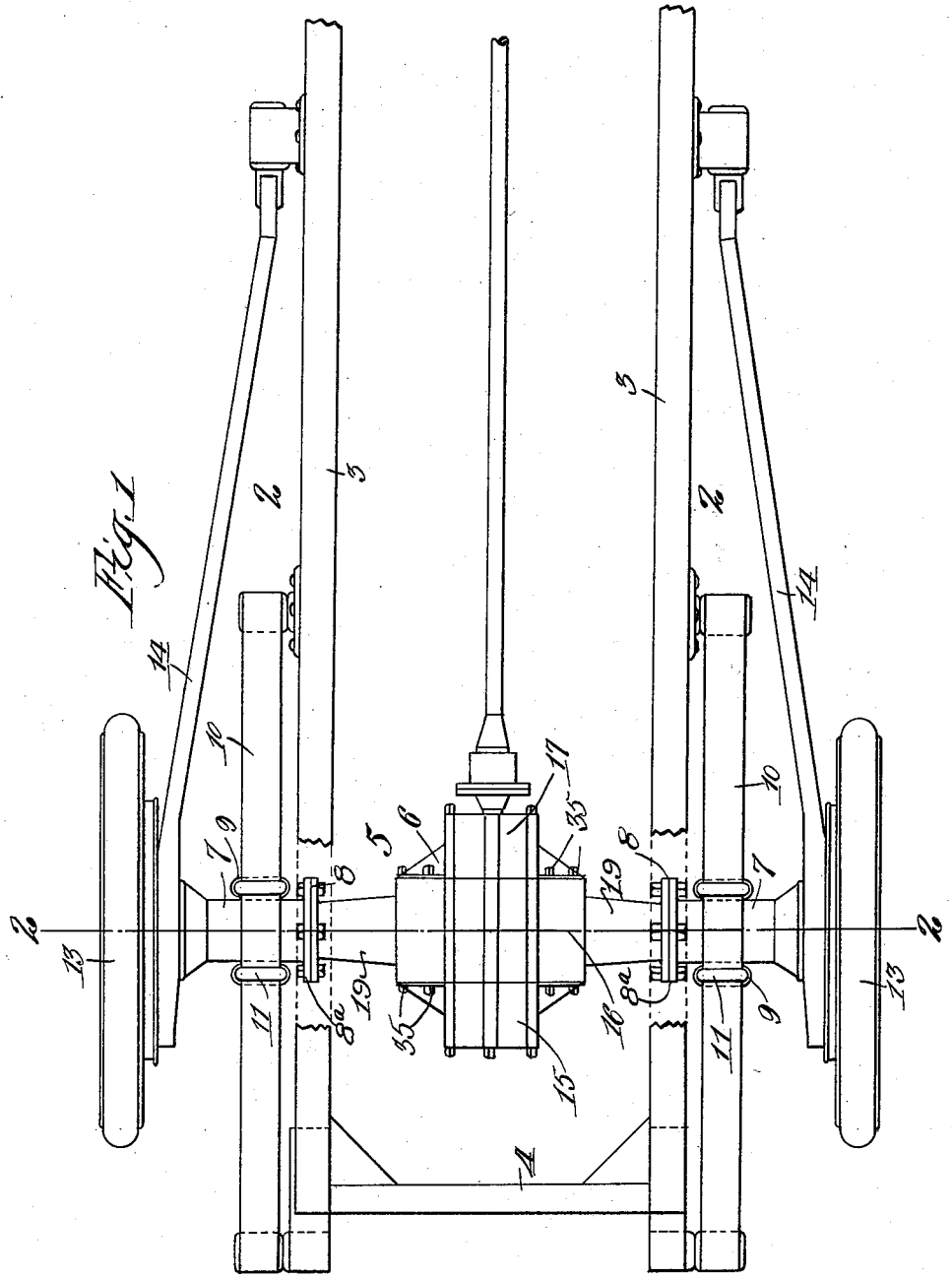

R. H. ROSENBERG.
GEARING.
APPLICATION FILED FEB. 14, 1912.
1,164,871.
Patented Dec. 21, 1915.
3 SHEETS—SHEET 3.
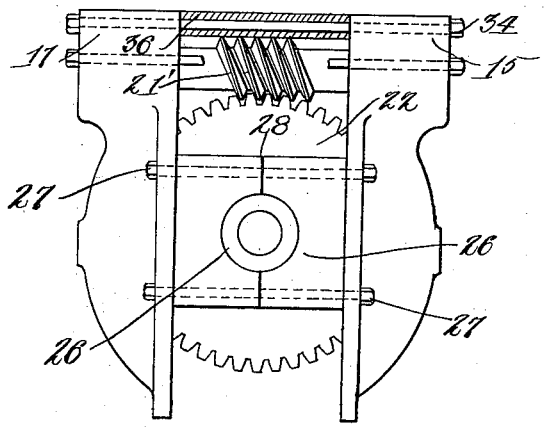
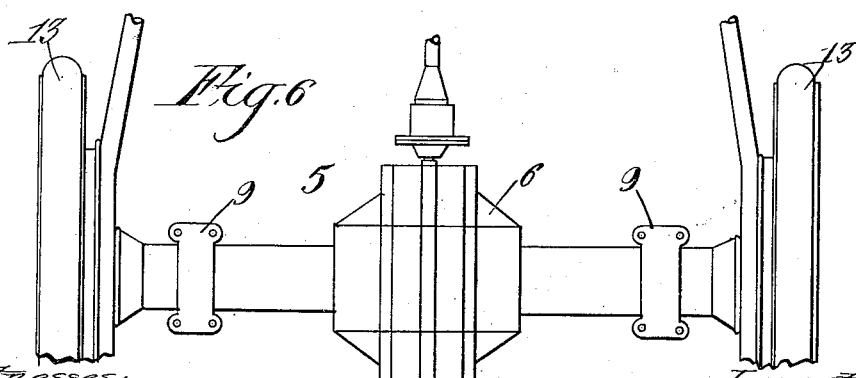

UNITED STATES PATENT OFFICE.

RALPH H. ROSENBERG, OF COLUMBUS, OHIO, ASSIGNOR TO THE KINNEAR MANUFACTURING COMPANY, OF COLUMBUS, OHIO, A CORPORATION OF WEST VIRGINIA.

GEARING.

1,164,871.  Specification of Letters Patent.  Patented Dec. 21, 1915.

Application filed February 14, 1912. Serial No. 677,556.

*To all whom it may concern:*

Be it known that I, RALPH H. ROSENBERG, a citizen of the United States, and a resident of the city of Columbus, county of Franklin, and State of Ohio, have invented certain new and useful Improvements in Gearing, of which the following is a specification.

My invention relates to improvements in automobiles and has particular reference to improvements in hollow or driving axles for such vehicles.

The object of my invention is to provide an improved driving axle for automobiles which shall be convenient to assemble and disassemble; which shall be of comparatively light weight and yet have ample strength for carrying the loads and resisting the strains to which such devices are subject.

A further object of my invention is to provide an improved housing for the driving axle and differential gearing so that during the manufacture and testing of the device the gearing can be fully inspected while running under full load.

A further object of my invention is to provide a hollow driving axle and a worm gear differential mechanism housed therein, the axle being so constructed that parts thereof may be removed and the gearing remain properly supported in its working bearings whereby the operation of the worm and gear is open to full view while being tested.

A further object of my invention is to provide a differential housing for a driving axle so divided that the gearing of the differential can be operated and tested in full view and supported at such times in proper relative positions and in their normal bearings, and thereafter the removed part can be assembled therewith to form a completely closed housing and with assurance that the gears will then be in the exact relative relations under which they were tested.

My invention consists in a hollow driving axle consisting of parts so associated and assembled that the above and other objects are attained, and all as herein described and particularly pointed out in the claims.

My invention will be readily understood by reference to the accompanying drawings, forming part of this specification and in which:

Figure 1 is a top plan view of one end of an automobile equipped with an axle embodying my invention; Fig. 2 is an enlarged central longitudinal sectional view of the axle on the line 2—2 of Fig. 1; Fig. 3 is a transverse central sectional view of the axle substantially on the line 3—3 of Fig. 2; Fig. 4 is a view somewhat similar to Fig. 3, but showing the center part of the casing removed; Fig. 5 is a sectional view similar to Fig. 2, the center portion of the casing being removed; and Fig. 6 is a top plan view of a modified form of axle.

I have chosen to illustrate my invention as embodied in a rear axle provided with a worm gear differential transmission, but it will be evident that my invention is also applicable to axles for use as front driving axles and for axles which are provided with other forms of differential gearing, and I, therefore, do not wish my invention limited to this specific form and use of axle.

In said drawings 2 represents the automobile frame, which consists of the side bars 3—3 and cross bars 4.

5 refers to the axle generally and the axle, as illustrated in Figs. 1 and 2, is divided longitudinally into three parts, the middle or center part 6 and an outer part 7 arranged at each end. These three parts are associated in longitudinal alinement and the end parts are secured to the outer ends of the middle part by means of flanges 8 and 8ᵃ provided upon their respective adjacent ends. Each of the end members 7 is provided with an annular flange or dowel 8′ which fits within the adjacent end of the middle part 6 and these parts are thereby maintained in proper relative position. The outer ends of the axle are provided with spring pads 9 which receive the springs 10 and the springs are secured by the spring bolts 11. The springs illustrated are half-elliptical and are pivotally connected to the side bars 3 of the automobile at their ends. The axle is hollow, as clearly shown in Fig. 2, and driving shafts 12 extend outwardly from the center of the axle through the parts thereof, and are connected to and serve to drive the road wheels 13. Radius rods 14 are mounted upon the outer ends of the axle between the wheels and the frame and are connected at their free ends with the side bars 3 of the automobile frame and serve to retain the axle against movement longitudinally of the frame of the automobile.

The middle part of the axle as clearly shown in the drawings comprises or is made up of three separate sections 15, 16 and 17. The sections 15 and 17 constitute front and rear side portions and the section 16 is interposed between these side portions and serves to connect them and complete the casing. When the parts are assembled, as shown in Figs. 2 and 3, they form a completely closed casing or housing for the differential mechanism 18 mounted therein, and with which the shafts 12 are operatively connected at their inner ends. The middle part of the section 16 is box-like in form, open upon two sides, and these two open sides are adapted to be closed by the sections 15 and 17 respectively. The box-like center part of the middle section is extended transversely at each end to form the connecting portions 19 which are provided on their ends with the flanges 8 and adapt this middle portion of the axle to be connected to the end parts 7. Each side wall 20 of the center section is provided with an opening 21 through which the inner end of the shaft is adapted to be inserted and this opening serves to guide the inner end of the shaft into its proper position when it is being inserted from the outer end of the axle into the differential gearing. The gearing shown in the drawings, and which is the preferred form for association with the hollow axle is a worm gear differential and comprises a worm 21', as shown in the drawings, arranged in the upper part thereof, and a worm wheel 22. The differential is completed by means of opposed bevel wheels 23 rotatively mounted in alinement with the shafts 12 respectively and complementary bevel wheels 24 mounted in and carried by the worm wheel 22. The opposed bevel wheels 23 are mounted in suitable bearings 23', one at each side of the worm wheel 22, and they are properly associated with the complementary bevel wheels 24 carried by the worm wheel for transmitting power from the worm wheel to the shafts 12. It will be clear that the shafts 12 are positively driven from the worm wheel through the medium of the bevel wheels and that when one shaft revolves slower than the worm wheel the opposite shaft will revolve proportionately faster. The worm wheel itself is mounted upon or integral with a central hub bearing 25 and this hub bearing extends at each side and is centrally mounted in the bevel gears 23. The bearings 23' in which the bevel gears 23 are carried, and which preferably comprise ball bearings, are mounted within rigid bearing pillars 26 which are formed integrally with and project inwardly from the sections 15 and 17 of the axle casing. These bearing pillars 26 are formed to meet upon the central plane of the axle and carry through bolts 27 by means of which the two sections 15 and 17 are firmly and securely clamped together. When the two parts are thus clamped together they provide shoulders 28 against which the gears 23 contact and the gears 23 are thus prevented from moving outward beyond their normal positions, and the gears 23 are provided with internal annular shoulders 29 against which the outer ends of the hub 25 of the worm gear contact and the bevel gears 23 are thereby prevented from moving inwardly from their normal position, and the worm wheel itself is thereby held in its position. In the upper part of each of the sections 15 and 17 are provided suitable bearings 31 for the worm 21'. These bearings 31 comprise both supporting bearings 32 and thrust bearings 33 arranged at each end of the worm, and the worm is thereby properly supported and held against movement away from its normal position relatively to the worm wheel in all directions.

The upper part of the casing is provided with three through bolts 34 which extend through and bolt the three sections 15, 16 and 17 tightly and securely together. The sections are further secured together by a number of short bolts 35 distributed around the joints between each section 15 and 17, and the center section 16. When the sections are assembled upon and with the differential gearing, as shown in Figs. 2 and 3, the casing is complete and tight except for the small clearance around the shafts at the holes 21, and the casing therefore forms an oil or grease tight casing for the differential gearing. It will be noted that the middle section 16 has the form of a double truss and its functions are, not only to form part of the casing for the gearing, filling in the open space between the two side parts 15 and 16 but it also serves as a connector between the gear casing and the outer ends of the axle, thereby serving as a casing for the shafts 12 and also as a load-carrying member which connects the wheeled ends of the axle together. The combination of the center section with the side parts 15 and 17 provide a hollow axle of great strength as the double truss thereby formed is relatively deep at its middle portion and the parts 15 and 17 serve as struts to stiffen and strengthen the walls of the truss member 16.

In the manufacture of devices of this character and particularly in the manufacture of worm gearing transmissions, it is very desirable that the worm gearing be capable of being operated for a considerable period of time with the worm and worm wheel in their proper relative positions, and when they are thus being operated that they shall be open to free inspection. These desirable features are inherent in my improved axle for, as clearly shown in Figs.

4 and 5, the center section 16 may be removed or, in other words, the parts 15 and 17 can be assembled upon and with the differential gearing without the center section 16, and when assembled in this condition the worm and the worm wheel are mounted in their regular bearings and are held in their normal positions relatively to each other and can be operated or tested in working condition and in full view. When the parts are assembled, as described, they are retained in position by the through bolts 27 which pass through the bearing pillars 26 and by the long bolts 34. These latter bolts being provided with pipe spacers or thimbles 36 which brace the upper parts of the two sections 15 and 17 apart and which, in a sense, take the place of or represent the portion of the middle section 16 which normally forms this part of the axle casing.

In Fig. 6 I have shown a slight modification of the axle in which the center section 6, instead of being provided with flanges to be bolted or secured to separate end sections is provided with these end sections formed integrally therewith. This form of axle is particularly adapted for the lighter vehicles or trucks while the preferred form is more particularly adapted for heavy work. One of the advantageous features of the preferred form is that the whole middle part 6 of the axle carrying the worm gear differential can be removed from the truck without disconnecting the springs from the end sections, and therefore repairs can be more readily accomplished particularly upon large and heavy trucks than could be effected if the differential were not thus readily and easily removable. To thus remove the part 6 of the axle it is only necessary to withdraw the shafts 12 from the differential gearing, remove the clamping bolts from the flanges 8 and then spring the end members 7 apart sufficiently to free the center part 6 from the dowels 8'.

As many modifications of my invention will readily suggest themselves to one skilled in the art, I do not limit or confine my invention to the specific structures herein shown and described.

Having thus described my invention, I claim as new and desire to secure by Letters Patent:

1. In a driving axle for automobiles, the combination of a differential mechanism having laterally extending removable driving shafts, driving gearing for those shafts including a worm wheel and worm shaft, two opposed inclosing members containing bearings for the worm shaft, and a third inclosing member containing bearings for the differential mechanism, said last mentioned inclosing member formed to be removably interposed between the first mentioned inclosing members and means for securing said inclosing members together.

2. In a driving axle for automobiles, in combination, a differential mechanism having laterally extending removable driving shafts, driving gearing for those shafts including a worm wheel and worm shaft, two opposed inclosing members containing bearings for the worm shaft, and a third inclosing member formed to be removably interposed between the first mentioned inclosing members and means for securing said inclosing members together to form a fluid tight housing for said differential mechanism and driving gearing.

In testimony whereof, I have hereunto set my hand, this 26 day of January, 1912, in the presence of two subscribing witnesses.

RALPH H. ROSENBERG.

Witnesses:
ROBERT H. COCHRAN,
EDWARD H. McCLOUD.

Copies of this patent may be obtained for five cents each, by addressing the "Commissioner of Patents, Washington, D. C."